United States Patent [19]

Yoshiyuji

[11] Patent Number: 4,477,201

[45] Date of Patent: Oct. 16, 1984

[54] CORNER MEMBER FOR FURNITURE ASSEMBLY

[75] Inventor: Hidetoshi Yoshiyuji, Bridgewater, N.J.

[73] Assignee: Takara Company, New York, Inc., Somerset, N.J.

[21] Appl. No.: 246,854

[22] Filed: Mar. 23, 1981

[51] Int. Cl.³ .............................................. F16B 9/02
[52] U.S. Cl. ................................... 403/231; 403/205; 403/403
[58] Field of Search ................ 52/285, 288, 287, 284, 52/281; 403/231, 205, 403, 402, 14, 306

[56] References Cited

U.S. PATENT DOCUMENTS

| | | | |
|---|---|---|---|
| 2,499,683 | 3/1950 | Reyes | 403/14 |
| 3,989,397 | 11/1976 | Baker | 403/205 |
| 4,104,839 | 8/1978 | Balzer | 52/281 X |
| 4,199,907 | 4/1980 | Bains | 403/403 X |

Primary Examiner—Thomas F. Callaghan
Assistant Examiner—Joseph A. Fischetti
Attorney, Agent, or Firm—Stephen E. Feldman

[57] ABSTRACT

An external decorative corner member of the type suitable for use in attaching furniture panels and the like. The length of this corner member can be adjusted to the panel dimensions. The corner member also serves to support the furniture panels during assembly and grooves provided in each portion of the inner flange speeds assembly by providing a location for attaching fasteners. The grooves further serve to strengthen each portion of the inner flange.

5 Claims, 2 Drawing Figures

CORNER MEMBER FOR FURNITURE ASSEMBLY

BACKGROUND OF THE INVENTION

The invention relates to a corner member for facilitating the assembly of furniture panels as well as making the assembly decorative.

Conventional assembly of furniture panels require some means of auxiliary support such as clamping in order to assemble two furniture panels which form a corner. The panel material is then fastened using glue or discrete fasteners such as screws. Such preparatory steps are time consuming and otherwise wasteful. Further when two furniture panels are joined directly to form a corner the individual panels have to be handled carefully in order not to mar the finishes at the edges to be joined. The present invention solves the foregoing problems.

DESCRIPTION OF THE PRIOR ART

Patents showing corner members and panel assembly methods are briefly described in the following paragraphs.

A patent to Borup, U.S. Pat. No. 3,111,206 illustrates a corner member for use in fastening panels together. The member described requires that the panels be placed under load in order to maintain alignment of the corner member before fastening.

Another patent to Lowery, U.S. Pat. No. 3,691,711 describes a corner member which is used to fasten panels together. The member shown can be adapted to use with furniture panels but is a relatively intricate extrusion.

An additional patent to Reilly, U.S. Pat. No. 4,126,304 shows a corner member which is used to fasten panels together. This corner member is again a relatively intricate extrusion.

Finally, the patent to King, U.S. Pat. No. 4,128,284 describes a corner member for use in forming drawers and the like. This corner member presents a simplified and improved method of making drawers.

The foregoing patents are various attempts to solve a problem similar to that solved by the present invention without providing for the ease of assembly or the decorativeness of this invention.

BRIEF SUMMARY OF THE INVENTION

It is an object of the present invention to provide a decorative corner member for attaching furniture panels;

Another object of the present invention is to provide a corner member which supports the attaching panel in position for fastening;

A further object of the present invention is to provide a corner member having a location of predetermined marking which facilitates location of the fasteners;

A still further object of this invention is to provide an economical corner member containing a minimum of material for the rigidity it provides.

DESCRIPTION OF THE PREFERRED EMBODIMENTS

Figure 1:
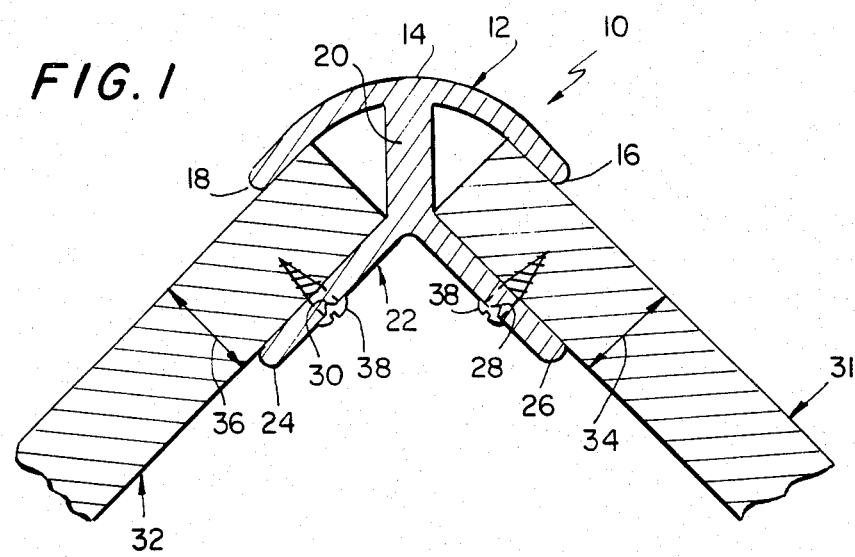
FIG. 1 is a fragmentary plan view of a corner member assembled with a pair of panels.

Reference to FIG. 1, shows a fragmentary plan view of decorative corner member generally designated 10 which is useful in assembling panels intended for use in furniture and the like.

Decorative corner member 10 has an outer flange generally designated 12 which consists of an arcuate portion 14 having connected integrally a first straight portion 16 and a second straight portion 18. Connected to and integral with the inner central area of arcuate portion 14 is a web 20 which is connected to and integral with an inner flange generally designated 22. Web 20 serves to maintain the pre-set dimension between outer flange 12 and inner flange 22. Web 20 is integrally connected to inner flange 22 at the intersection of a first planar portion 24 and a second planar portion 26 both integrally connected with each other.

First straight portion 16 is spaced from first planar portion 24 by a distance 34, forming a pocket, which is predetermined by the corresponding dimension of a first panel 31. Similarly, second straight portion 18 is spaced from second planar portion 26 by a distance 36, forming a pocket, which is also predetermined by the corresponding dimension of a second panel 32, it is self evident that corner member 10 can be made to accommodate panels of differing dimensions, if need be. First planar portion 24 and second planar portion 26 each have respectively a first groove 28 and a second groove 30 in its outside face, as shown in FIG. 1. These grooves 28 and 30 are centrally located on respective planar portions 24 and 26 and serve to strengthen these portions of corner member 10 is an extrusion. Further, first groove 28 and second groove 30 serve to locate a multiplicity of screw fasteners 38 which require clearance holes to be drilled in portions 24 and 26. Grooves 28 and 30 position the drill bit which is used to drill the clearance holes. Grooves 28 and 30 in portions 24 and 26 keep the drill bit from wandering laterally on planar portions 24 and 26. Grooves 28 and 30 then save assembly time since there is no need to punch mark corner member 10 for drilling. Grooves 28 and 30 also contribute to a stronger corner joint since the drilled holes will tend to wander toward an edge of planar portions 24 or 26 if drilling is attempted without punch marking first.

FIG. 1 also shows a typical corner assembly with first panel 31 and second panel 32 inserted into respective pockets of corner member 10. Member 10 serves to maintain the relationship between first panel 31 and second panel 32 while screw fasteners 38 are being placed.

Corner member 10 provides for a stronger corner connection between panels 31 and 32 than would be possible when making a corner by abutting panels 31 and 32. The use of corner member 10 results in a safer corner since it is less likely that a person will be injured when accidentally striking corner member 10. The relatively large radius of arcuate portion 14 is also less injurious than the sharp corner, or small radius corner resulting from abutting panels 31 and 32.

Figure 2:
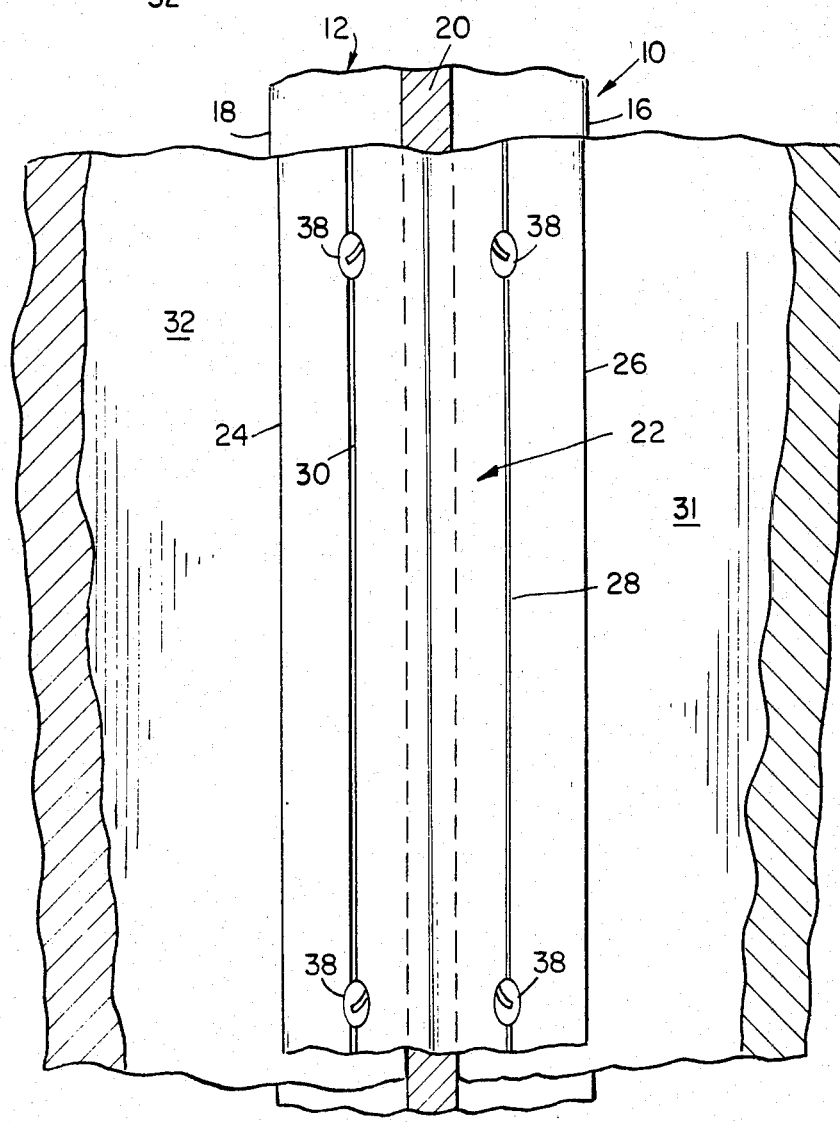
FIG. 2 is a fragmentary elevational veiw of a corner member assembled with a pair of panels.

FIG. 2 shows a fragmentary elevational view of corner member 10 assembled with panels 31 and 32. This FIG. does not show any additional details which have not been discussed in the foregoing paragraphs. FIG. 2 does show more clearly the relationship between fasteners 38, grooves 28 and 30 and panels 31 and 32.

Corner member 10 is preferably extruded and may be of any length which can conveniently be extruded. It may be formed of aluminum, other metals or rigid plastic, all materials which are conventionally extruded. Although corner member 10 is preferably extruded it may be manufactured by other processes not herein mentioned.

The embodiment of the invention particularly disclosed and described herein above is presented merely as an example of the invention. Other embodiments, forms and modifications of the invention coming within the proper scope and spirit of the appended claims, of course, readily suggest themselves to those skilled in the art.

What is claimed is:

1. An extruded corner member of the type suitable for use in attaching panels comprising:
    a longitudinal outer flange comprising a central arcuate portion and a pair of straight portions each tangentially joined to one longitudinal edge of said arcuate portion;
    a longitudinal web of constant width, said web being connected to a central region of said central arcuate portion; and
    a longitudinal inner flange consisting of two longitudinal planar portions and connected to said web, said planar portions having a common boundary at said web connection, whereby each planar portion is substantially parallel to a respective opposing one of said straight portions of said outer flange member, to form pockets of substantially uniform width for receiving said panels, said pair of straight portions each having their unjoined longitudinal edge substantially opposite the midpoint of each respective opposing planar portion, said pair of longitudinal planar portions each having a longitudinal groove on the outside face thereof, for strengthening said planar portion, said groove being used to locate holes to be drilled therein.

2. The corner member of claim 1 wherein:
    said pockets formed by said planar portions and said straight portions will accommodate panels of equal thickness.

3. The corner member of claim 1, wherein:
    said pockets formed by said planar portions and said straight portions will accommodate panels of different thickness.

4. The corner member of claim 2 wherein:
    said pockets form an angle of approximately 90 degrees.

5. The corner member of claim 3 wherein:
    said pockets form an angle of approximately 90 degrees.

* * * * *